United States Patent [19]
Eichenlaub

[11] Patent Number: 5,410,345
[45] Date of Patent: Apr. 25, 1995

[54] STROBOSCOPIC ILLUMINATION SYSTEM FOR VIDEO DISPLAYS

[75] Inventor: Jesse B. Eichenlaub, Rochester, N.Y.

[73] Assignee: Dimension Technologies, Inc., Rochester, N.Y.

[21] Appl. No.: 942,718

[22] Filed: Sep. 9, 1992

[51] Int. Cl.⁶ ............................................. H04N 13/04
[52] U.S. Cl. ........................................ 348/59; 348/54; 359/475
[58] Field of Search ................................ 359/462–464, 359/475–477; 358/3, 88; H04N 13/04, 15/00; 348/54, 59

[56] References Cited

U.S. PATENT DOCUMENTS

| | | | |
|---|---|---|---|
| 3,858,001 | 12/1974 | Bonne | 359/463 X |
| 4,717,949 | 1/1988 | Eichenlaub | 358/3 |
| 4,829,365 | 5/1989 | Eichenlaub | 358/88 X |
| 4,872,750 | 10/1989 | Morishita | 358/3 X |
| 4,945,407 | 7/1990 | Winneck | 358/88 |
| 4,957,351 | 9/1990 | Shioji | 358/3 X |
| 4,959,641 | 9/1990 | Bass et al. | 358/3 X |
| 5,036,385 | 7/1991 | Eichenlaub | 358/3 |
| 5,040,878 | 8/1991 | Eichenlaub | 358/88 |
| 5,083,199 | 1/1992 | Börner | 358/88 |
| 5,132,839 | 7/1992 | Travis | 359/463 X |

Primary Examiner—Mark R. Powell
Attorney, Agent, or Firm—Cumpston & Shaw

[57] ABSTRACT

In a flat panel autostereoscopic display full resolution equal to the number of pixels in the two-dimensional light valve array, which serves to generate images, is achieved by incorporating an illumination system which makes use of stroboscopic light sources or continuously lit light sources in combination with electro-optical shutter means. The lighting system when used in conjunction with a 2-D flat panel display, achieves image resolution exceeding several times the pixel resolution of the light valve array.

49 Claims, 7 Drawing Sheets

STROBOSCOPIC ILLUMINATION SYSTEM FOR VIDEO DISPLAYS

BACKGROUND

1. Field of the Invention

This invention relates to illumination systems designed to improve image resolution and permit look-around viewing in liquid crystal and similar flat panel transmissive three dimensional (3-D) displays and enhanced resolution two dimensional (2-D) displays, for use in computers, television and the like viewing apparatus.

2. Prior Art

Several display systems are on the market today which are capable of generating three-dimensional images based on the use of stereopairs, i.e., complementary images, which when directed to the appropriate eye of the observer, produce a perception of three-dimensionality. Two of such systems, one made by Stereographics, Inc., the other by Tektronix Corp., utilize cathode ray tubes in conjunction with liquid crystal light valves designed to direct the appropriate half of the stereopair to the left or right eye of the observer. Both of these systems require the observer to wear special glasses. In addition, in order to achieve full resolution, these displays operate at frame rate twice the standard television (TV) scanning rates, thus making them incompatible with commercially available TV scanners, video camera recorders (VCR), and like apparatus.

A third system made by Dimension Technologies Inc. is autostereoscopic, i.e., it permits the observer to perceive 3-D without the need to wear glasses. The system uses a transmissive image generating liquid crystal panel (LCD) and is disclosed in U.S. Pat. Nos. 4,717,949; 4,829,365 and 5,040,878. In this system a multiplicity of parallel, equidistant, thin, bright, vertical light lines is generated using an optical device termed the "reflection plate" which carries on its one surface opposite the planar surface facing the LCD, a series of parallel ridges equal in numbers to the number of said light lines. The ridges, triangular in cross-section, are designed to intercept light rays tangentially projected by a cylindrical lens onto said ridge-bearing surface of said reflection plate from a linearly configured light source disposed on the vertical side of the LCD. This method for generating a lattice of lines is specifically described in U.S. Pat. No. 5,040,878. An image-generating LCD is situated parallel to and in front of a reflection plate, separated by a small fixed distance of, say, 3 mm, such that the observer, due to the parallax effect of vision, sees with his left eye the light lines through the odd-numbered pixel columns of the LCD, and the even-numbered pixel columns with his right eye. Thus, an illusion of depth is created, albeit by sacrificing one half of the pixel resolution in the 3-D image.

Another optical configuration for the generation of lines for an autostereoscopic display has been disclosed in U.S. Pat. No. 5,036,385, which employs a lenticular lens or fly's eye lens to generate a lattice of light lines. This configuration allows multiple sets of light lines in different locations to be made to flash on and off in sequence, allowing for the display of full resolution autostereoscopic images that can be viewed in correct perspective from across a wide angle. These configurations also allows the generation of multiple sets of light lines or points for the display of two dimensional images with resolution greater than that provided by the pixels of the LCD.

Accordingly, it is an object of this invention to provide illumination systems for imaging devices, such as disclosed in U.S. Pat. No. 5,036,385, which will be effective, economical and convenient for implementation of full resolution 3-D displays, look around 3-D displays, and enhanced resolution 2-D displays.

Another object of this invention is the use of fluorescent lamps for the illumination system.

A further object of this invention is to utilize stroboscopic gas filled arc lamps for said illumination systems.

Yet another object of this invention is to use electro-optical shutters in conjunction with the appropriate light source for said illumination systems.

Still another object of this invention is to utilize high-brightness projection type cathode ray tubes as the means for generating appropriate light patterns for use in said illumination systems.

An additional object of this invention is to use two-dimensional matrices of high-brightness light-emitting diodes (LEDs) of any one or any combination of at least three different colors as the means for generating appropriate light patterns for use in said illumination systems.

A further object of this invention is to use an electroluminescent or AC plasma display as light sources for generating appropriate light patterns for use in said illumination systems.

Yet another object of this invention is to provide electronic control systems to control the timing of on-off states of said light sources and said electro-optical shutters in synchronization with the raster scanning of said flat panel displays for the purpose of formation of 3-D and 2-D images.

Still a further object of this invention is the implementation of said illumination systems using a plurality of light sources emitting light of different colors in conjunction with a monochromatic flat panel light valve displays for the purpose of generating full resolution 3-D and enhanced resolution 2-D color images. Still other objects will be apparent to those skilled in the art upon reference to the following detailed description and the claims.

SUMMARY OF THE INVENTION

In accordance with this invention there is provided in both autostereoscopic and non-autostereoscopic high resolution displays, the improvement in illumination system comprising one or more linear or point like light sources, an electronic means for controlling the on and off states of said light sources in synchronization with the process of image generation on an electronically controllable light valve, a lenticular or fly's eye lens sheet spaced apart from and in front of said light emitting sources so as to focusing the light into patterns of lines, line segments, or point like areas, said light patterns illuminating selected portions of the light valve.

DESCRIPTION OF THE PREFERRED EMBODIMENTS

Figure 1:
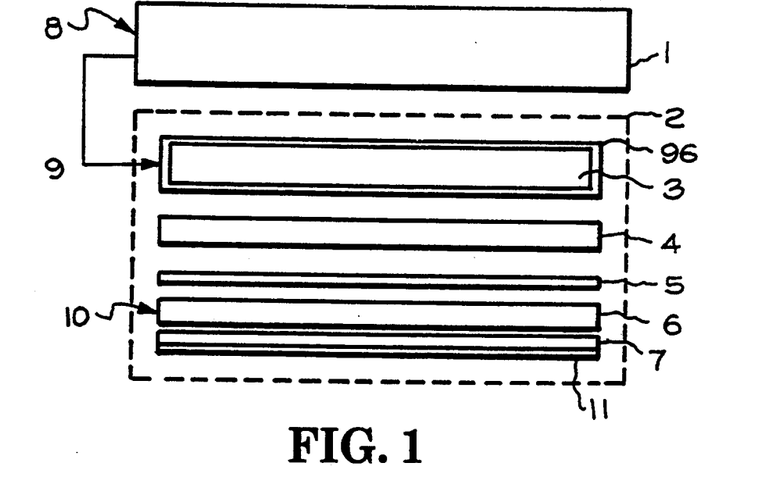
FIG. 1 is a schematic diagram which illustrates the basic optical concepts of the invention.

The basic concept of displays using the stroboscopic illumination systems object of this invention is explained with reference to FIG. 1 which depicts schematically a general configuration of autostereoscopic and 2-D displays incorporating the system. A two dimensional light valve array 6, such as a liquid crystal panel (LCD) or a similar imaging device, is used to generate images by electronically scanning the array 6 which is comprised of rows and columns of individual pixels. The operation of such imaging devices is well known to those skilled in the art. Information is inputted to the LCD 6 via an input 10 which is usually a ribbon cable.

The illumination of the LCD 6 is provided by the stroboscopic or non-stroboscopic light source means 3, which is described in its several versions in the following, can consist of several different types of light sources, some in combination with electro-optical shutters. The emitting regions of the light sources will generally be long, thin, and vertically oriented or will be small and point like, as described in U.S. Pat. No. 5,036,385. Light source means 3 is controlled and driven by signals through input 9 from the electronic control module 1. Control module 1 receives its timing signals through input 8 and generates a sequence of light flashes appropriately synchronized with the generation of an image on LCD 6. In addition to light sources or combination of light sources and electro-optical shutters, the light source means 3 contains appropriate reflectors, mechanical supports, cooling means, and means for adjusting the position of said light sources to achieve a desired geometry of the illumination system. An opaque flat black non-reflective barrier 96 blocks the area between and to the sides of the light sources 3, so as not to allow light to exit the light source 3 or be reflected from the light source 3 from points other than the light source 3. Barrier 96 can be a flat black metal plate with slots or holes cut in its surface in front of the light source 3.

A system of baffles (not shown) consisting of opaque barriers extending out from the barrier 96 can be placed in the system to prevent light from light source 3 from reaching points on the lenticular lens far from the area directly in front of the light source 3. These barriers generally reduce the amount of scattered light in the system, and reduce the brightness of ghost images—that is, images intended for the right eye which seen faintly by the left eye and vice versa—which are caused by scattered light which strikes the diffuser 5 in the area between the light lines.

Optical means 4, such as a lenticular lens or fly's eye lens, focuses the light from said light source means 3 onto a weakly diffusing transparent panel 5, the purpose of which is to slightly broaden the angle from which these light lines can be seen though the LCD 6. The panel 5 typically consists of a clear substrate of a certain thickness, with a thin layer of diffusing material bonded to its rear most surface. A glass or plastic panel 7 with an antireflection (AR) thin film coating 11 on its front surface is disposed of in, or bonded to the front of the LCD 6 so as to reduce disturbing reflections from the ambient light sources.

As described in detail in U.S. Pat. No. 5,036,385, the doubling of the pixel resolution of a 3-D image generated using an autostereoscopic display is achieved by rapidly generating partial images on the LCD 6 and stroboscopically illuminating the appropriate section on LCD 6 in synchronism with the image generation. In this manner it is possible to use the same sets of pixel columns to display left and right halves of the stereo-pair, thus doubling the resolution of the display, as compared to earlier schemes, e.g., see U.S. Pat. No. 4,717,949. If said partial images are generated and illuminated at a rate above the fusion frequency of vision, no flicker is perceived.

The look-around capability in autostereoscopic displays, as described in U.S. Pat. No. 3,036,385, makes it possible for the observer to sees the 3-D image from several perspectives, not unlike a hologram. To implement this function several images representing the different perspective views of the object or a scene are interlaced with one another and are scanned in sequentially into the LCD 6 and the stroboscopic illumination is synchronized such that the different perspective views appear in different viewing zones, so that as the head of the observer moves with respect to the screen of the display, appropriate views, corresponding to the perspective appear. Such images of actual scenes or objects can be generated in real time using a number of TV camera pairs, or computer-generated images can be presented using one of several available image rotation programs.

A similar approach can be used to increase the resolution of non-stereoscopic (2-D flat) panel displays to several times beyond the physical pixel resolution of an LCD. In this case, different subsections of each pixel are sequentially illuminated, while each pixel varies its transparency to correspond to different sub sections of a high resolution image, such that a detailed total image can be observed because of vision persistence with resolution several times greater than the pixel resolution of the LCD 6. In this latter case, the light lines are so positioned with respect to the pixel columns in the LCD 6 that at any given instant the observer sees only a part of a given pixel. Thus, the complete high resolution image is built up sequentially but fast enough to avoid flicker.

In the present embodiment of the autostereoscopic display 2 the light source 3 is a bank of aperture fluorescent lamps, i.e., a fluorescent lamp with a narrow transparent slit parallel to its major axis, internally scribed into the light-emitting phosphor. The configuration allows for very bright light to be emitted by the lamp through said slit.

In place of said fluorescent lamp a short filament incandescent lamp has been used in conjunction with a fiber optic device which converts the image of the short filament into a long line of light which is then directed in a similar manner onto said lenticular lens sheet.

Intense illumination, and consequently bright images, can be generated using linear gas filled arc stroboscopic lamps, such as xenon flash lamps, as the light sources 3 in the above described light line generation scheme. The stroboscopic lamps operate at a rate considerable above the fusion frequency threshold of human vision (24-30 Hz), so that no flicker is perceived. Gas filled DC arc lamps can also be used.

Another method of illumination is to use a very bright point like incandescent lamp situated at some distance behind the lenticular lens 4. This method of illumination produces exceptionally bright 3-D images.

Xenon flash lamps and light emitting diodes (LEDs) light sources have also been experimentally utilized.

Other possibilities for light sources for this illumination system are projection type cathode ray tubes (CRT), electro-luminescent and AC plasma display panels The pixels on these types of displays generally can be made to emit their light in strobe fashion when addressed, and thus can be used as light sources for the type of illumination systems described in this application.

Because in the present autostereoscopic display referenced above one half of the pixel columns of the LCD are used to display one half of the stereopair, the resolution of 3-D images with this type of display is one half of the pixel resolution of the LCD.

The lenticular lens 4 is a transparent plate which has on its one surface an array of very narrow vertically disposed parallel cylindrical lenslets. When the lenticular lens is appropriately illuminated from behind, it generates the lattice of light lines required for autostereoscopic viewing. The number of said lenslets is equal to one half of the number of pixel columns of LCD 6 or less. The fly's eye lens version uses a two dimensional array of spherical lenses of circular or square outline on the same type of transparent plate. It can be used to image thin, vertically oriented light sources into light lines or it can be used to image smaller, more point like light sources into light spots. The various means of illumination described above can be utilized with these lenses.

Figure 2:
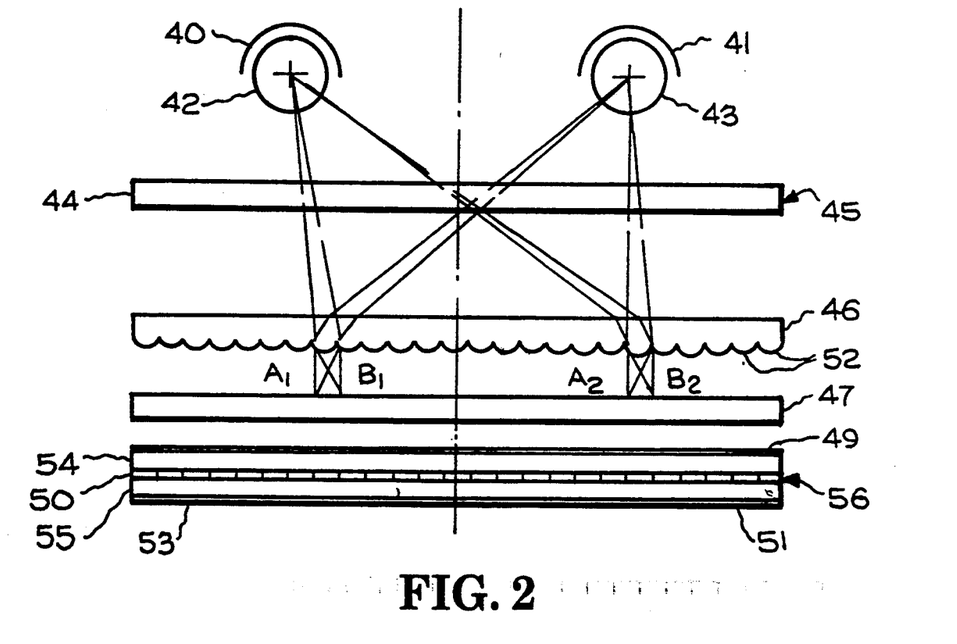
FIG. 2 is a schematic view from above of another embodiment of this invention, an illumination system employing two stroboscopic light sources.

A top view of an embodiment of the invention using two stroboscopic light sources is shown schematically in FIG. 2. Light sources 42, 43 have linear geometry and are operated sequentially in a stroboscopic mode. The light sources 42, 43 can be any of the types of light sources described above. Reflectors 40, 41 can be used to increase the intensity of light projected toward the front of the display.

A commercially available electrically controlled diffuser 44 is transparent when 3-D images are being displayed. When 2-D presentation is desired, the diffuser 44 is actuated by applying a voltage via input 45 such that it changes its state from strongly diffusing to transparent (or vice versa in some cases) thus changing the nature of illumination from the type of uniform, diffuse illumination as required for 2-D images to one in which the light sources 42 and 43 are imaged by the lenticular lens 46 to generate a lattice of light lines for 3-D imaging. Such diffusers are made by Polytronics and Raychem in the United States, and other companies overseas.

It is generally desirable that the lenticular lens 4 and electronically controlled diffuser 44 have anti reflective coatings on their front most and rear most surfaces, that any non diffusing surface of weakly diffusing transparent panel 47 has an antireflective coating, and that the rear most surface of the LCD has an anti reflective coating. As an alternative, the front most surface of diffuser 5 can be bonded to the rear most LCD surface with an optically clear bonding agent, achieving the same effect of greatly reducing reflections at these surfaces.

The arrangement described above and in U.S. Pat. No. 5,036,385 can be used with steadily shining light sources to from steady lines of light, allowing the display of autostereoscopic images with one half the resolution provided by the LCD's pixels, as described in U.S. Pat. No. 4,717,949.

The light lines required in this embodiment to make it possible for the observer to perceive an illusion of a 3-D image are generated by means of the lenticular lens 46 which is a large array of thin, evenly spaced cylindrical lenslets forming a part of a transparent substrate. The geometry of the illumination system is so designed that light source 42, when it is on, generates a set of vertical light lines of which two, B1 and B2, are indicated in the drawing, to the right of the centers of the lenslets 52; and source 43 generates a set of vertical light lines, A1 and A2, to the left of the center of the lenslets 52. Only one set of light lines can be seen at a time because these light sources 42 and 43 operate sequentially.

The lenslets 52 focus the images of the active parts of the light sources 42 and 43 on the weakly diffusing transparent panel 47, the purpose of which is to slightly widen the angle from which said light lines are visible to the observer, i.e., to widen the zone of observation and also make the brightness of the illumination appear to be more uniform across the display.

The observer sees the light lines through the LCD 53 which comprises a two-dimensional array of cells 50 filled with a liquid crystal substance, and sandwiched between two sheets of glass 54 and 55 which are coated with polarizing film 49 and 51. The driving signals to control image generation on said LCD 53 are fed though the input 56.

Figure 3:
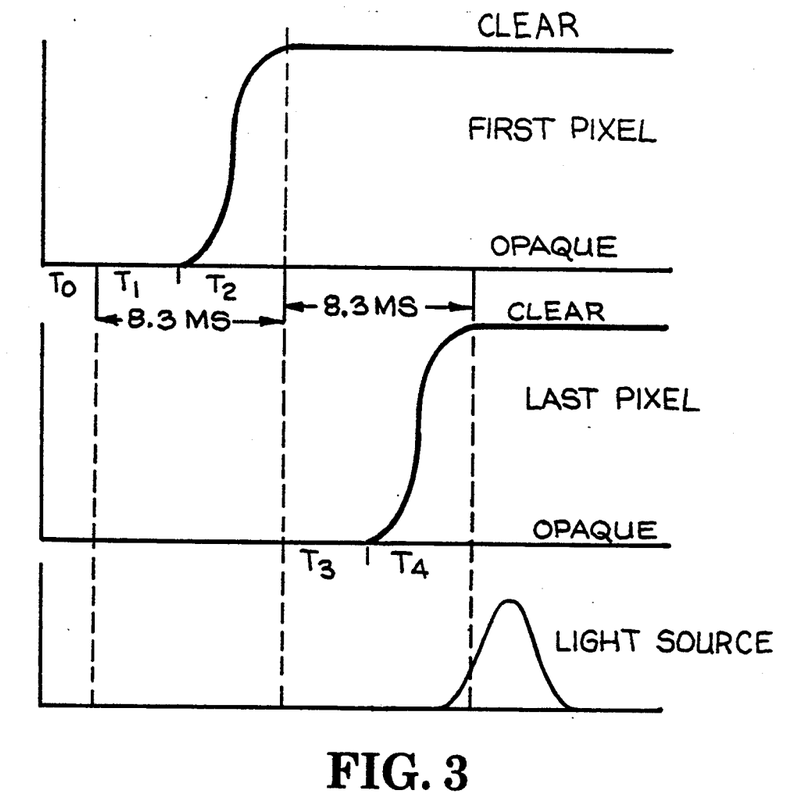
FIG. 3 is a timing diagram which illustrates the changes of light transmission states of the first and the last pixels in a video frame in the liquid crystal display of FIG. 2.

The timing diagram of FIG. 3 depicts the change from "off" or opaque state to "on" or clear state (or vice versa) of the first and the last pixels in a video frame. In the case of Thin Film Transistor (TFT) and Ferroelectric LCDs, when a pixel is turned on during the scan of LCD 53, it stays on until turned off, in this case until the building up of an entire video frame is completed, and the last pixels have had time to change their state. It is understood that not all of the pixels will necessarily change their state, as required by the display of a particular image. The signal to turn on the first pixel is given to the LCD 53 at time $t_0$; because of a slight delay in pixel response to the applied signal, it begins to turn on at time $t_1$ and completes the change in its state from opaque to clear at time $t_2$. The last pixel starts its state change at time $t_3$ and completes it at time $t_4$. At this instant the video frame is complete and light source 42 flashes, thus transferring the information to the observer, and the build up of a new video frame field begins, with the next image representing the remainder of the same stereopair. A total of 16.6 ms has elapsed from the time the turn on signal has been applied to the first pixel to the completion of the change in state of the last pixel and flash of the light source. Thus, there are 60 fields per second or 30 images (video frames) per second. This scanning, changing, and flash sequence proceeds continuously, as subsequent image frames, each consisting of two sequential fields made visible to the observer by means of two lamp flashes, are displayed. The two image fields each consist of interleaved right and left eye members of a stereopair image as described in U.S. Pat. No. 5,036,385.

Figure 4:
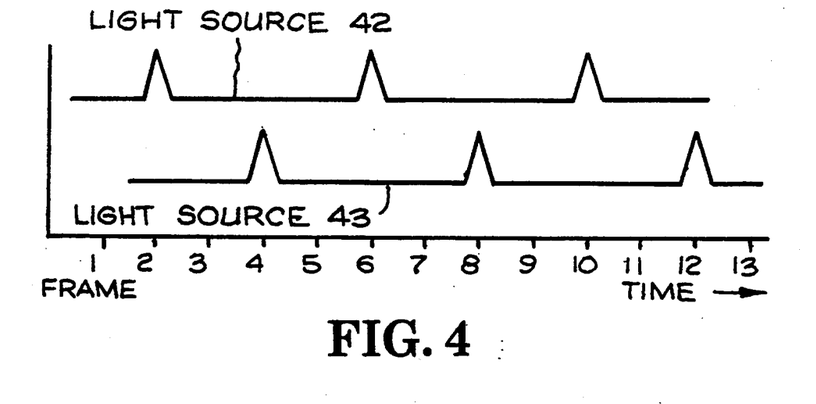
FIG. 4 is another timing diagram which illustrates the relation between the generation of video frames in the display and the timing of the light pulses from the stroboscopic light sources.

FIG. 4 depicts the relation of the flashes of light sources 42 and 43 to the field generation on the LCD 53. As is shown, time is divided into periods numbered consecutively on the diagram starting with 1. During the odd periods, labeled 1, 3, etc., the LCD is scanned and all the rows of pixels are addressed. These correspond to the time period $T_0$ to $T_3$ in FIG. 3. The even periods, labeled 2, 4, etc., are waiting periods during which no addressing action is taken, and all the pixels on the LCD, including the very last ones addressed, are allowed to change to their new state after being addressed. These periods correspond to the time period $T_3$ to $T_4$ in FIG. 3.

The two periods are shown as being roughly equal in FIG. 4, but the wait periods can be shorter or longer than the scan periods, depending on how fast the Liquid Crystal material in the LCD can change its state. If the periods can be equal, that is, if the LC material changes state in about the same amount of time as it takes to scan the LCD, then an extra scan can be performed during the even time periods, during which the information of the previous odd field is scanned onto the LCD a second time. This will result in a slightly brighter, more uniform image with greater contrast when a conventional TFT LCD is used. The reason for this is that charge slowly leaks across an LCD pixel cell after it changes state and is waiting for the next address, causing its transmittance to drop slightly during the remainder of the scan and wait periods. A second scan will cause the pixel transmittance to stop falling and return, at least partially, to its proper value by the time the lamp flashes.

Figure 5:
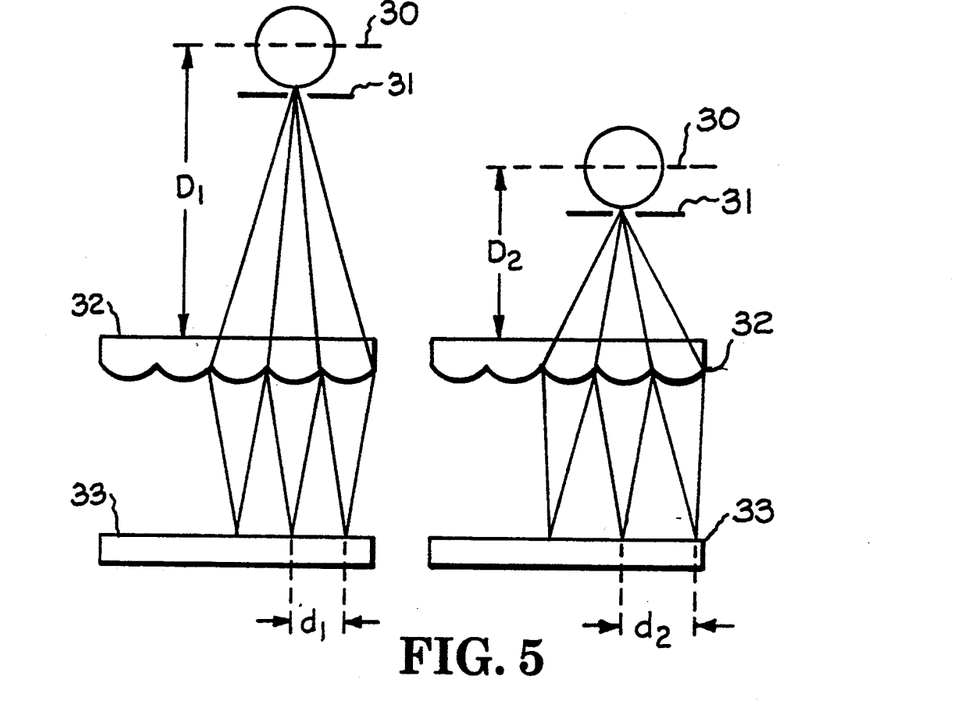
FIG. 5 is a portion of the system of FIG. 2 demonstrating the effect of varying the distances between the elements of the optical system.

By changing the distances between the light sources 30 and the lenticular lens 32 as indicated in FIG. 5, it is possible to vary the pitch between the light lines imaged on the weakly diffusing panel 33. It is also possible to adjust the width of the left and right eye viewing zones in this manner, to match the interpupillary spacing of the observer and provide the maximum amount of lateral head movement for that observer. In this way it is possible to adjust the illumination system to the pixel geometry on an LCD. In addition, by also varying the distance between the lenticular lens 32, said diffusing panel 33, and the LCD, it is possible to vary the best viewing distance from the LCD to the observer.

Figure 6:
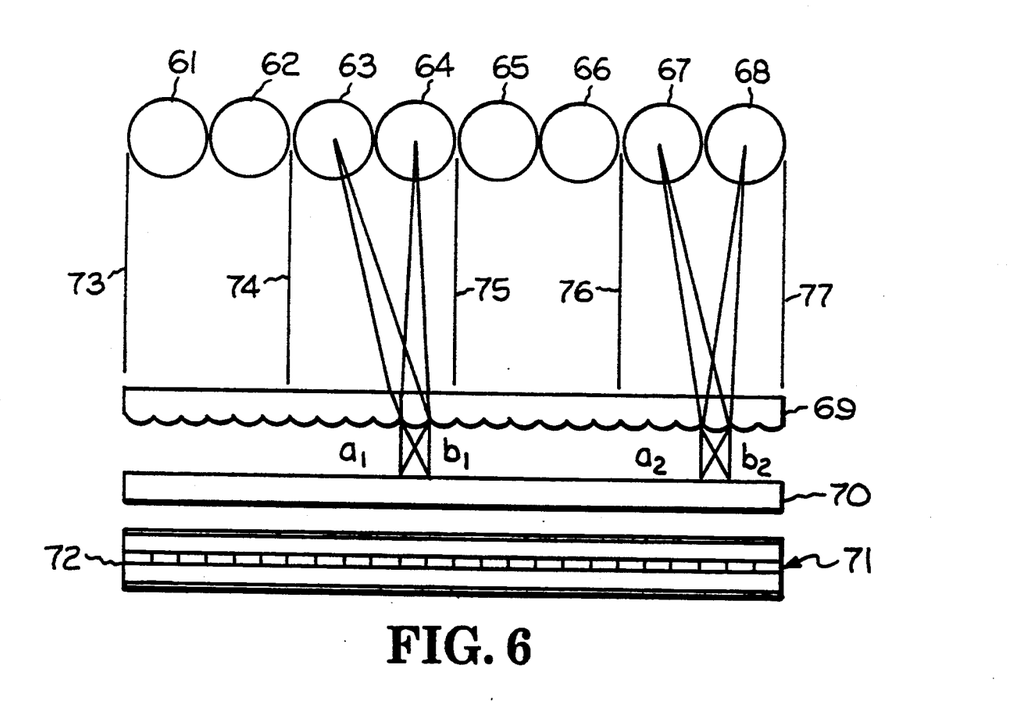
FIG. 6 is a schematic optical layout, as seen from above, in which a plurality of stroboscopic light sources are employed operating in synchronism with the image generation using column by column addressing of the liquid crystal panel.

A version of the illumination system of FIG. 2 is illustrated as a top view in FIG. 6. In this system instead of two a plurality of light sources 61 through 68 are positioned such that each pair of light sources illuminates one vertical section of the lenticular lens 69. The light sources 61 through 68 can be fluorescent lamps or gas filled arc lamps, such as those filled with Xenon gas. Baffles 73 through 77 prevent light from one pair of the light sources shine on another section of the lenticular lens 69 other than the section in front of each lamp. The lenticular lens 69 images the light sources 61 through 68 on to the weakly diffusing panel 70 generating a lattice of thin, bright, vertical lines the purpose of which is as explained earlier. In this example, the column of the LCD pixels are addressed sequentially, during each field, starting with the left most column, and proceeding to the right most column.

Lamps 61, 63, 65 and 67 flash in sequence at predetermined intervals synchronized with the build up of one half of a stereopair image on the LCD 72. The first half image displayed during the first field is made up of the odd columns of the left eye image displayed on the odd columns of the LCD 72 and of the even columns of the right eye image, which are displayed on the even columns of the LCD 72, as is explained in U.S. Pat. No. 5,036,385. After the section of the first half image in front of lamp 61 is generated, (i.e. the pixels in that section complete their change of state) light source 61 flashes, thus transferring the video information to the observer. The process is sequentially repeated by light sources 63, 65 and 67 until light source 67 flashes when the last pixel in the last section of the first half of the stereopair is addressed or changes its state. The second half of the stereo image is scanned in the same manner into the same set of pixels, thus achieving full resolution of the stereo image, and the set of light sources 62, 64, 66 and 68 flash in sequence and synchronism with the build up of the image on LCD 72 oriented as shown in FIG. 6.

The main advantage of this embodiment of this invention is that most of the wait period or pause period, where one is waiting for all the pixels, including the very last ones, to complete their change is shortened. Each of the smaller sections is illuminated as soon as the pixels within that section complete their change, which may occur while another part of the LCD is still being addressed. Indeed, if the pixels can complete their change in a period of time less that the interval between the address of the last column of their section and the next address of the first column of their section, the LCD can be addressed continuously, without any pause period between fields.

Although FIG. 6 shows eight light sources, it is understood that any number of light sources, constrained in their number only by the physical dimensions of the display and the dimensions of the light sources themselves, could be used in this illumination scheme.

Given the arrangement of FIG. 6, the lamps do not necessarily have to flash in a very short interval. They can remain on for the duration of the period between the time when the pixels of the last addressed column of section in front of them complete their change to the time when the pixels in the first addressed column are addressed again during the next scan.

It is possible to use essentially the same illumination system, as explained above, to generate 2-D images with resolution several times that of the pixel resolution of the LCD, given appropriate optics and light source configurations already known to those skilled in the art.

The forgoing diagram and explanation has used the case of an autostereoscopic full resolution display for illustrative purposes. This type of display requires two sets of interleaved light lines, each set positioned halfway between the member of the other set. The display generates two full resolution images, forming a stereo pair, that are visible from a series of left and right eye viewing zones spaced across a viewing region in front of the display. U.S. Pat. No. 5,036,385 also describes a multiple perspective view full resolution display providing a look around effect, which generates several different full resolution perspective views of a scene, each of which is visible from within a different viewing zone, several of which are spaced across a viewing area in front of the display. This type of display relies on multiple sets of flashing light lines.

Figure 6A:
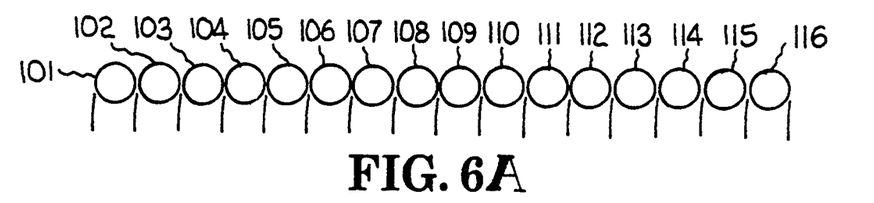
FIG. 6A is an arrangement and flashing sequence that can be used to generate four sets of light lines for a four zone display.

As an example, the arrangement and flashing sequence of FIG. 6 can be used to generate four sets of light lines for a four zone display if a total of 16 lamps were used instead of 8. The lamps are shown in FIG. 6A. Lamps 101, 105, 109, and 111 flash on as the first of four images (consisting of interleaved parts of four perspective views, as described in U.S. Pat. No. 5,036,385) is built up on the LCD. Next lamps 102, 106, 110, and 114 would flash on in sequence as the next image is built up, then lamps 103, 107 111, and 115, would flash on as the third image is built up, then lamps 104, 108, 112, and 116 would flash on as the fourth image is built up.

Figure 7:
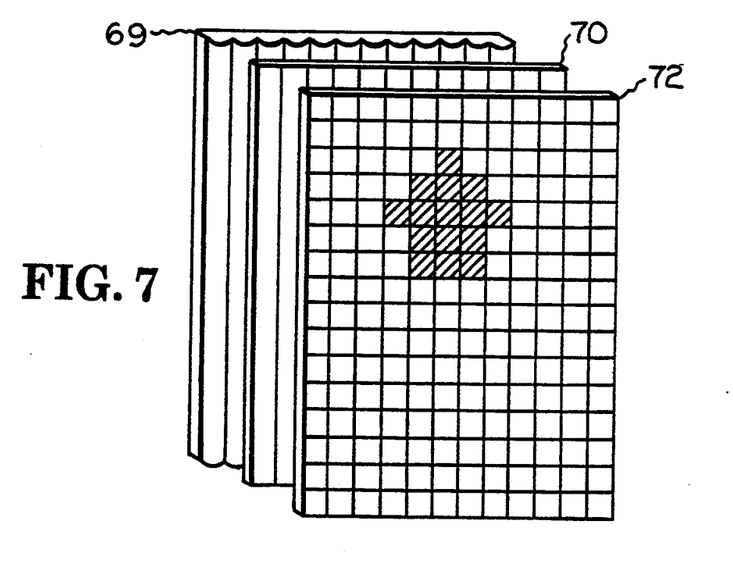
FIG. 7 shows schematically the configuration of a display using the illuminating system of FIG. 6.

As shown in FIG. 7 said LCD 72 is rotated 90 degrees against its commonly used orientation, i.e., its long dimension is vertical. This is called the "portrait format", and is useful in many applications. Because of this orientation the rows of pixels are used as columns and the columns are used as rows. The reason for this format is that all commonly available LCD drive circuits are designed to scan the LCD in a raster format, row-by-row; this configuration, consequently, takes advantage of this process.

Figure 8:
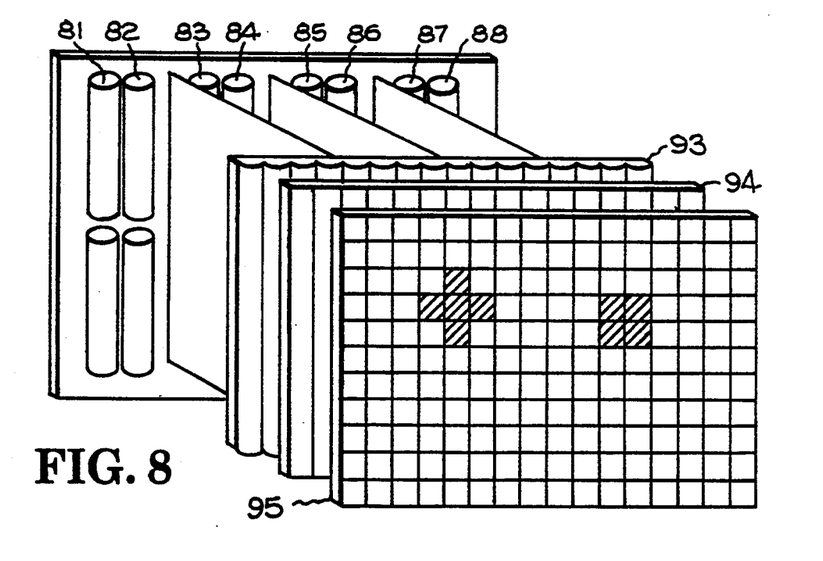
FIG. 8 is an autostereoscopic display utilizing segmented light sources for generating light lines of partial length to provide further improvement in the method for using stroboscopic means to increase resolution of autostereoscopic and 2-D displays where the liquid crystal display is addressed row by row.

Similar illumination systems can be used in a configuration of autostereoscopic and enhanced resolution 2-D displays in which the longer side of the LCD is horizontal, the so-called "landscape" format. Such a system is depicted in FIG. 8. A plurality of light sources 81–88 and 91, 92, etc. are also used in this scheme. However, in contrast to the illumination system described with reference to FIG. 6, light sources 81–88 do not extend over the entire height of the display, but are divided into vertical sections of equal heights. While FIG. 8 shows two such sections 81–88 it is understood that more than two sections could be used, constrained in their number only by the physical dimensions of the display and the physical dimension of the light sources. Said light sources can be fluorescent lamps or gas filled arc lamps, such as those filled with Xenon gas, operating in stroboscopic mode. Arrays of small lamps such as LEDs can be used to good effect, as can addressable flat panel emissive displays such as EL and plasma displays.

This illumination system operates as follows: the first half image is progressively scanned in on the LCD 95 starting with the top (first) row until in this case, the scan of the upper half of the LCD 95 screen is completed and the pixels in the upper half have made their change to form the image (the scan, meanwhile, can continue through the lower half of the LCD). At this instant light sources 81, 83, 85 and 87 flash, thus transferring the video information on the top half of the screen to the observer. The scan of the LCD 95 proceeds until the lower half of the screen is completed. As soon as the pixels on the lower half complete their change, the lower set of light sources 91, etc., is triggered to flash, causing the video information on the LCD 95 screen to be transferred to the observer. Now, the process is repeated in the identical manner for the next interleaved half image, using first the light sources 92, 94, 96, 98, then the light sources 92, etc., in this manner transferring the remainder of the image to the observer, and thus, because of the vision phenomenon of image retention, generating the illusion of a non-flickering full resolution three-dimensional image.

While the pixels of the lower half of the first half image are being allowed to change their state, the upper half of the next half image can begin to be scanned in. Again, if the pixels change their state fast enough so that all the pixels in each half have completed their change before the scan of the other half is complete, the LCD can be scanned continuously and no pause period will be required.

Lenticular lens 93 generates images of vertical light lines on the weak diffusing panel 94. In the configuration illustrated in FIG. 8 the light lines are about one half the height of the LCD 95. The height of the light lines in a particular display configuration depends on the number of sets of light sources.

This illumination system with different lamps and optics can be also used to generate enhanced resolution 2-D images by successively illuminating different subsections of the LCD, as described above.

Likewise, any number of columns might be used. The number of columns would be constrained only by the width of the lamps and the required width of the illuminating area.

Figure 8A:
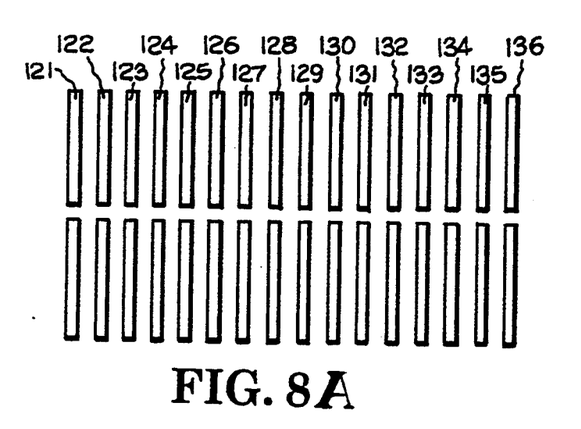
FIG. 8A illustrates a lamp arrangement capable of producing four sets of light lines.

For the look around case, more lamp sets would again have to be used. A lamp arrangement capable of producing four sets of light lines is illustrated in FIG. 8A. The lamps are arranged in 16 columns of two lamps each. Here the top members of lamp columns 121, 125, 129, and 133 would flash on all at the same time after the top half of the first image had formed, and then the bottom members of lamp columns 121, 125, 129, and 133 would flash on when the bottom half of that image had formed. Likewise with the top and bottom members of lamp columns 122, 126, 130, and 134 would flash on as the second part of the image was formed, then the top and bottom members of lamps 123, 127, 131, and 135 as the third image was formed and finally the top and bottom members of lamp columns 124, 128, 132, and 136.

The image formation concepts, as explained with reference to FIGS. 2 through 8, can be implemented in a display configuration illustrated schematically in FIG. 9. The illumination system in this configuration does not employ flashing light sources; rather, the light sources 101 through 109 mounted on the base 100 are constantly lit. Such light sources, could be, preferably, fluorescent lamps. The light from said light sources is diffused by the strong diffuser 110 to produce homogeneous illumination of the electro-optical shutter array 111 preferably employing fast acting liquid crystal valves.

At the present time, typical shutters of this type will have low contrast when viewed from off angle. This means that when in the off state they do not efficiently block light that is passing though them at various high off axis angles. Baffles, similar to those shown in FIG. 2, and be employed to block this light and prevent it from scattering within the system and causing ghost images to be visible.

It is generally desirable, when the shutters employed are LC devices that require front and rear polarizers, to use linear polarizers whose polarization angles whose directions of polarization are in the vertical and horizontal directions. In that configuration, light blockage tends be most efficient at angles far from normal in both the vertical and horizontal directions, allowing the display to be viewed from far off axis in these directions without ghost images becoming a problem. It is desirable, of course, to also make the polarization directions of the front shutter polarizer and the rear LCD polarizer to be parallel, thus maximizing light transmission. It is also desirable, if the rear polarizer of the LCD is of optimal type for use with the shutter LC material, and if its polarization direction is vertical or horizontal, to leave off the front polarizer from the shutter, and simply rely on the LC rear polarizer to perform the light blocking function in the shutter off state. This results in slightly greater light transmission in the on state.

Figure 9:
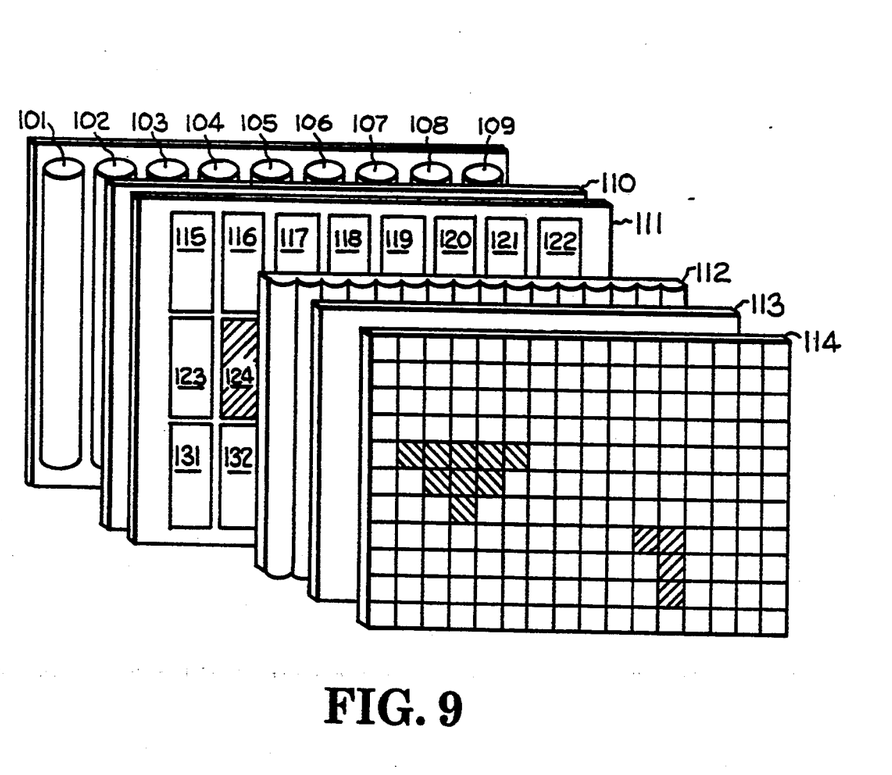
FIG. 9 is a schematic diagram of an optical layout for using electro-optical shutter means in conjunction with linear geometry light sources in another version of an illumination system of the present invention.

The on-off, i.e. clear and opaque, states of the individual shutters 115 through 124 etc., 131, 132 etc. of the electro-optical shutter array 111 illustrated in FIG. 9 are controlled in synchronism with the scanning of the LCD 114 and are turned on in a sequence, similarly to the sequence of light sources flashes in the display shown in FIG. 8. As scanning and pixel change on the LCD 114 proceeds from top to bottom, and completes ⅓ of the LCD's height, light shutters 115, 117, 119 and 121 are turned on momentarily allowing the light to pass to the lenticular lens 112 which generate the first set of light lines on the diffusing panel 113 and, consequently, transfers the first part of the interleaved image to the observer. Next the second third of the one half of the image is scanned in and light shutters 123, etc. are turned on when this part of the image is scanned in, followed by the last third of the image.

While the pixels in the last third of the first half image are changing their state, the first third of the next half image can be being scanned into the upper third of the LCD 114 and transferred to the observer by momentarily turning on the shutters 115, 117, 119, 121. In this manner fast and efficient transfer of video information is achieved.

Figure 10:
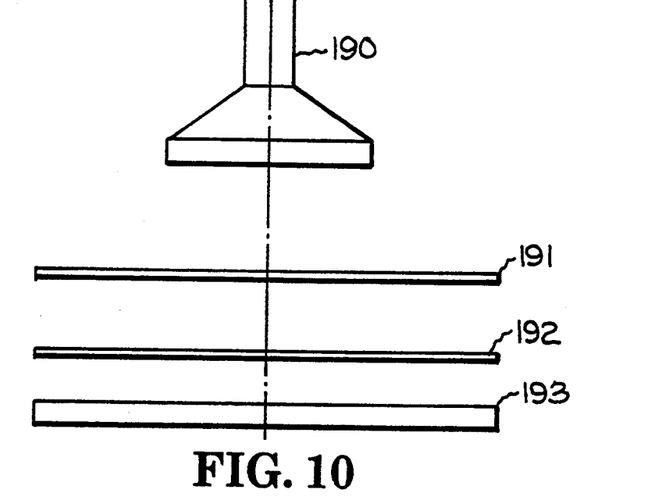
FIG. 10 is a schematic diagram of a top view of an optical layout for implementing the illumination system using a cathode ray tube.

FIG. 10 depicts yet another illumination system for autostereoscopic and enhanced resolution 2-D displays. In this system a high intensity projection type CRT 190 is used to generate patterns of light lines or points in synchronism and an appropriate sequence with the scanning on the LCD 193. The light lines are projected onto a strong diffusing panel 192 by the focussing lens 191. The sequence of LCD scanning and light line generation can be as described with reference to the description of the illumination systems of FIGS. 2, 5, 7, 8 and 9, or another suitable sequence where the lines or points projected on to the diffuser 192 replace the lamps indicated in the figures. Stereoscopic or enhanced resolution 2-D images are generated as already described.

Figure 11:
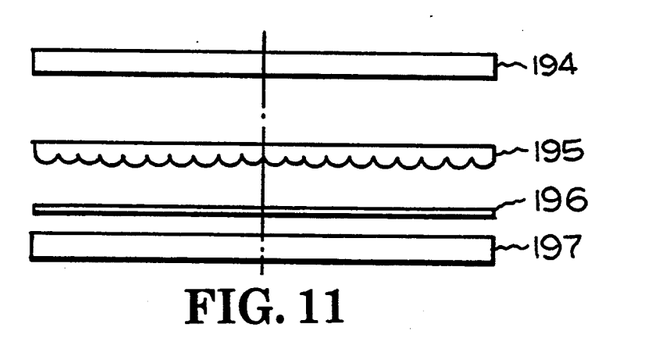
FIG. 11 is a schematic diagram of a top view of an optical layout for using an electro-luminescent device or an AC plasma display as a light source in the illumination system.

The system shown in FIG. 11 makes use of an electroluminescent or plasma panel 194 which has a predetermined pattern of addressable lines or pixels that are actuated in an appropriate sequence in synchronism with the scanning of the LCD 197. In some cases, customized EL or plasma displays of the type normally used for information display can be employed. As in previously described systems, a lenticular or fly's eye lens 195 images lines or points generated on the panels onto the weakly diffusing panel 196, and the stereoscopic or enhanced resolution 2-D images are produced as described above.

Figure 12:
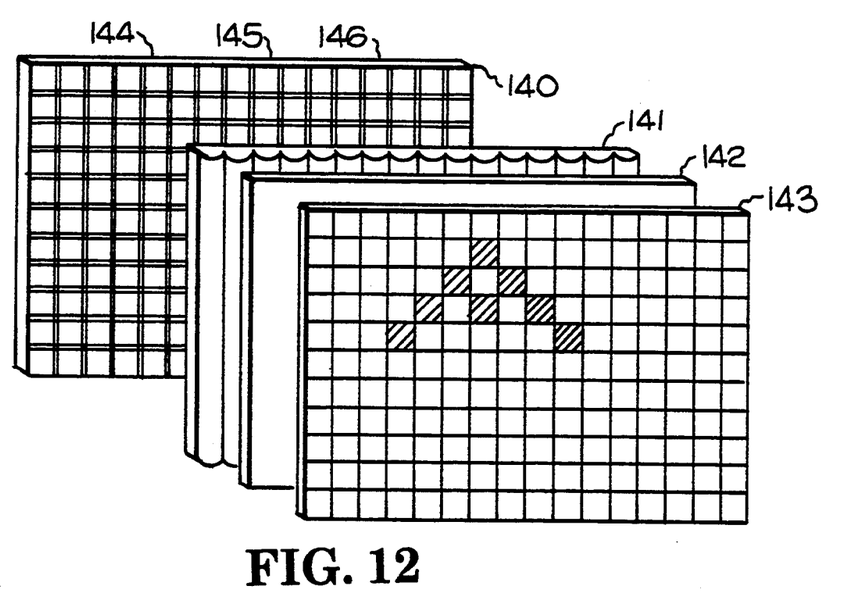
FIG. 12 is a schematic diagram of an optical layout for using light emitting diodes as light sources in the illumination system.

Yet another method of creating the illumination required for generation of stereoscopic or enhanced resolution 2-D images can take advantage of light emitting diodes (LEDs) as light sources. Such devices are increasingly commercially available in a variety of colors and with high brightness. FIG. 12 shows one version of a display utilizing LEDs.

A two-dimensional array 140 is comprised of a large plurality of LEDs 144, 145, 146 etc. Such LEDs can all be of one color, say, green, for monochromatic displays, or can be a set of three primary colors, red, blue and green, for color displays.

Since the brightness of blue LEDs is not as high as that of red and green devices, double the number of blue LEDs could be used in each LED cluster in the LED array 140.

The LEDs can be discrete packaged devices mounted in a array on a base, or chips mounted on a suitable substrate.

The LEDs individually or in light-pattern on color generating sets are turned on and off in synchronism with the scanning of the LCD 143. The light generated by said LEDs is focused by the lenticular lens 141 onto the weakly diffusing panel 142 to form the light lines or points necessary for observation of stereoscopic or enhanced resolution images on the LCD 143.

Figure 13:
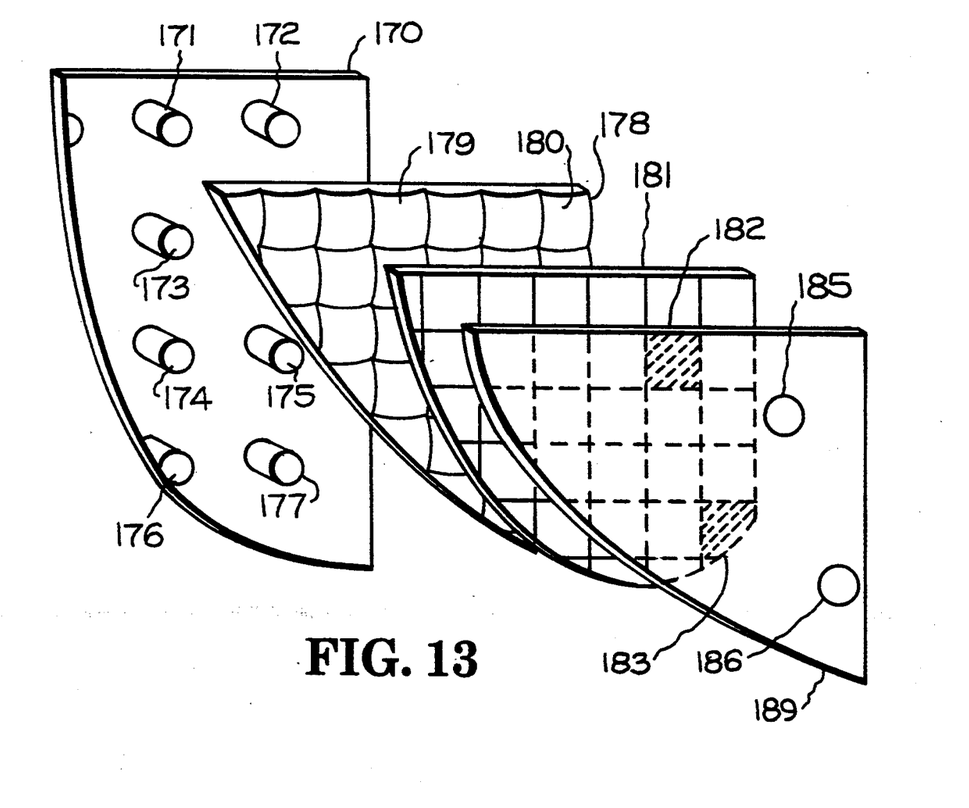
FIG. 13 is a schematic diagram of an optical layout of an enhanced resolution 2-D display in which light emitting diodes of different colors are used as light sources and a fly's eye lens is employed as the optical means for directing and focussing light.

For color displays, a sequence of red, blue and green components of the images can be generated on a monochrome LCD which are fused by the vision of the observer in to a color image, as described in U.S. Pat. No. 5,040,878. As an example an optical configuration of an LED-based color illumination system for 2-D displays is depicted in FIG. 13 which shows a much enlarged partial perspective view of said system. Here also a monochromatic (black and white) LCD is utilized. As in the system explained with reference to FIG. 12, LED's which emit light of at least three primary colors are used. Such LEDs can be, for example, 174 (red), 175 (green), 176 and 177 (blue) (two blue LEDs to compensate for lower light output). Said LEDs direct its light output toward a fly's eye lens 178 which comprises a two-dimensional array of very small convex lenslets, such as lenslets 179 and 180. The number of said lenslets in said fly's eye lens 178 is equal to the number of pixels in the LCD 181. Hence, each lenslet focuses the light to one pixel in the LCD 181. When the pixels are in their on (clear) state (e.g. pixels 182 and 183) they transmit the light from the lenslets to a diffusing panel 184 where this light form color dots, such as 185 and 186. In this manner images can be formed on the diffusing plate 184.

In order to achieve color in this display, red, blue and green constituent color images are displayed in a rapid sequence using the same pixels and the corresponding lenslets, by appropriately turning on and off sequentially sets of all LEDs of the same color, while scanning in into the LCD the corresponding constituent image. In such constituent images are changed at a frame rate of 180 per second, flicker-free color images will be displayed.

Figure 14:
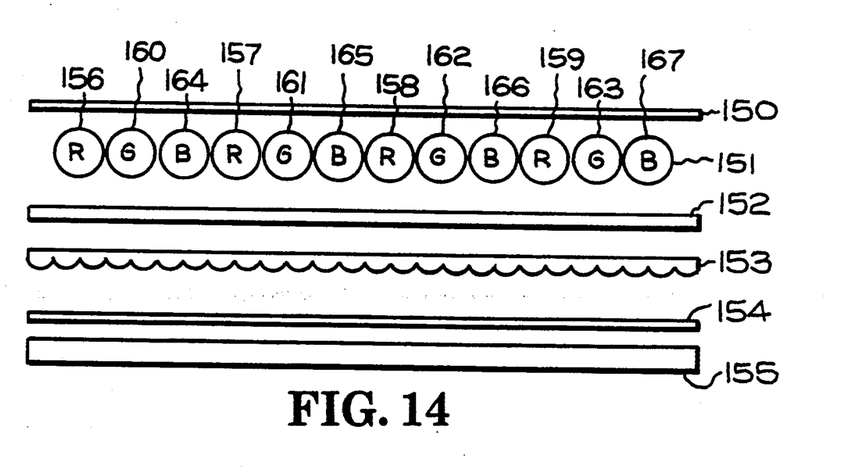
FIG. 14 is a schematic diagram of a top view of an optical layout and control electronics for implementing both 2-D and 3-D displays using light sources of different colors.

Monochromatic LCDs can also be used in conjunction with other color light sources, such as fluorescent or gas filled plasma discharge lamps to generate color stereoscopic or enhanced resolution 2-D images. One embodiment of this scheme is illustrated in FIG. 14. The main advantage of this approach is that monochrome LCDs are readily commercially available in a variety of sizes and speeds and have much higher light transmission than color LCDs.

FIG. 14 depicts the top view of an autostereoscopic or an enhanced resolution 2-D display. Light sources 156 through 167 are mounted on the base 150. There are three sets each of four light sources; red 156–159, green 160–163, and blue 164–167. It is understood that the number of sets of light sources is not limited to four; such number will be only constrained by the physical dimensions of the display and the dimensions of the light sources. Fluorescent and gas filled plasma discharge lamps in three primary colors are readily commercially available.

The foregoing examples and methods have described for the purpose of illustration and not limitation. Many other variations and modifications of the embodiments described in this disclosure will become apparent to those skilled in the art based on this disclosure. These are intended to be comprehended as included within the scope of this invention.

I claim:

1. An improved illumination system for high resolution displays, comprising a linear or point like light source, an electronic means for controlling the on and off states of said light source in synchronization with the process of image generation on an electronically controllable light valve array, optical focusing means spaced apart from and in front of said light source so as to focus the light into patterns of lines, line segments, or point like areas in a plane substantially adjacent to the light valve array, said focusing light patterns illuminating selected portions of the light valve array.

2. The illumination system of claim 1 in which the linear or point like light source comprises a plurality of light sources.

3. The illumination system of claim 2 in which the light sources and optical focusing means are positioned with respect to one another and the light valve array in such a way as to create rapidly blinking sets of lines or points of light for the purpose of creating high resolution 3 D images.

4. The illumination system of claim 2 in which the light source and optical focusing means are positioned with respect to one another and the light valve array so as to focus rapidly blinking sets of lines or points of light close to or within the pixel layer of the array so as to create 2 D images with a resolution exceeding the pixel resolution of the light valve array.

5. The illumination system of claim 2 in which mechanical means is provided for adjusting the position of said light sources in relation to each other and in relation to the optical focusing means.

6. The illumination system of claim 2 having means for repeatedly addressing the light valve array in row by row or column by column fashion, there being a finite time period between the address of any individual light valve (pixel) and the time that the valve has completed its change in transparency as a result of the address; further having means for timing the light source to turn on during the period between the time when the pixels that are in a section of the array generally in front of it have started their change in transparency, and the time when the pixels in said section are addressed again, the light source being turned off outside of these time periods.

7. The illumination system of claim 6 in which baffling means is provided between the light source and the optical focusing means so as to allow the light source to illuminate only the section of the light valve that is generally in front of it.

8. The illumination system of claim 6 in which said light source is a cathode ray tube.

9. The illumination system of claim 6 in which said light source is a plasma display.

10. The illumination system of claim 6 in which said light source is an electro-luminescent means.

11. The illumination system of claim 2 in which the light sources are comprised of steady light emanating means and further comprising light transmission controlling means placed between the light sources and the observer to achieve a stroboscopic effect.

12. The illumination system of claim 11 in which said light transmission controlling means is an array of light valves.

13. The illumination system of claim 12 in which said array of light valves are electrically controlled liquid crystal devices.

14. The illumination system of claim 2 which includes an electrically controlled light diffusing means placed between the light source and the optical focusing means, said diffusing means being capable of changing between a clear, transparent state and a light scattering, diffuse state under control of the user.

15. The illumination system of claim 14 further comprising optical antireflection means on surfaces of at least one of the optical focusing means, the electrically controlled light diffusing means and between transparent components of different indices of refraction, or on surfaces between transparent components and air, so as to reduce reflections at these surfaces.

16. The illumination system of claim 2 which includes a passive light diffusing means between the light source and a plane upon which the optical focusing means focuses the light and creates the light patterns.

17. The illumination system of claim 16 in which the light diffusing means comprises a substrate and a diffusing material bonded to a surface of the substrate.

18. The illumination system of claim 17 in which the substrate comprises one or more sheets of transparent material, said sheets being mounted in contact with the rear most surface of the light valve on the side facing away from the observer.

19. The illumination system of claim 18 further comprising optical antireflection means on surfaces of the light diffusing means and the transparent sheets of the substrate and between transparent components of different indices of refraction, or on surfaces between transparent components and air, so as to reduce reflections at these surfaces.

20. The illumination system of claim 2 in which the light sources comprise fluorescent lamps.

21. The illumination system of claim 2 in which the light sources comprise gas filled arc lamps.

22. The illumination system of claim 2 in which the light sources comprise gas filled plasma discharge lamps.

23. The illumination system of claim 2 in which the light sources comprise light emitting diodes.

24. The illumination system of claim 2 in which said light sources generate light of one color.

25. The illumination system of claim 2 in which said light sources generate light of a plurality of colors.

26. The illumination system of claim 2 in which said light sources are of at least three different types, each type capable of emitting light of a different color.

27. The illumination system of claim 2 in which said light sources emit red, green, and blue light.

28. The illumination system of claim 1 in which the optical focusing means comprises a lenticular lens sheet.

29. The illumination system of claim 1 in which the optical focusing means comprises a fly's eye lens sheet.

30. An improved illumination system for an autostereoscopic display comprising a point like or linear light source and optical focusing means spaced apart from and in front of said light source so as to focus the light into arrays of lines, line segments, or point like areas on a plane substantially adjacent a light valve array, said focusing light patterns illuminating selected portions of the light valve array.

31. The illumination system of claim 30 in which said light source is a cathode ray tube.

32. The illumination system of claim 30 in which said light source is an electro-luminescent device.

33. The illumination system of claim 30 in which the optical focusing means comprises a fly's eye lens sheet.

34. The illumination system of claim 30 in which the optical focusing means comprises a lenticular lens sheet.

35. The illumination system of claim 30 in which the linear or point like light source comprises a plurality of light sources.

36. The illumination system of claim 32 which includes a passive light diffusing means adjacent the optical focusing means upon which the optical focusing means focuses the light and creates the light patterns.

37. The illumination system of claim 36 in which the passive light diffusing means comprises a substrate and a diffusing material bonded to a surface of the substrate.

38. The illumination system of claim 37 in which the substrate comprises one or more sheets of transparent material, said sheets being mounted in contact with the rear most surface of the light valve on the side facing away from the observer.

39. The illumination system of claim 38 further comprising optical antireflection means on surfaces of at least one of the passive light diffusing means including the sheets of transparent material of the substrate and the optical focusing means and between transparent components of different indices of refraction, or on surfaces between transparent components and air, so as to reduce reflections at these surfaces.

40. The illumination system of claim 32 including a non reflective, opaque barrier adjacent said light sources, configured in such a way as to prevent light from passing through it except at the light source locations.

41. The illumination system of claim 32 in which mechanical means is provided for adjusting the position of said light sources in relation to each other and in relation to the optical focusing means.

42. The illumination system of claim 32 in which baffling means is provided between the light sources and the optical focusing means so as to allow each light source to illuminate only the section of the light valve that is generally in front of it.

43. The illumination system of claim 32 in which the light sources comprise fluorescent lamps.

44. The illumination system of claim 32 which includes a passive light diffusing means located between the light source and the optical focusing means.

45. The illumination system of claim 32 in which the light sources comprise light emitting diodes.

46. The illumination system of claim 32 in which the light sources comprise gas filled plasma discharge lamps.

47. The illumination system of claim 32 in which the light sources comprise gas filled arc lamps.

48. The illumination system of claim 32 which includes an electrically controlled light diffusing means placed between the light sources and the optical focusing means, said diffusing means being capable of changing between a clear, transparent state and a light scattering, diffuse state under control of the user.

49. The illumination system of claim 48 further comprising optical antireflection means on surfaces of at least one of the electrically controlled light diffusing means, the optical focusing means and between transparent components of different indices of refraction, or on surfaces between transparent components and air, so as to reduce reflections at these surfaces.

* * * * *

UNITED STATES PATENT AND TRADEMARK OFFICE
CERTIFICATE OF CORRECTION

PATENT NO. : 5,410,345
DATED : April 25, 1995
INVENTOR(S) : Jesse B. Eichenlaub

It is certified that error appears in the above-indentified patent and that said Letters Patent is hereby corrected as shown below:

Column 1, line 4, insert the following:
This invention was made with government support under Contract No. 733615-90-C-3802 awarded by the Department of the Air Force.

The government has certain rights in the invention, namely in

Claims 14 and 48.

Signed and Sealed this

Fifth Day of September, 1995

Attest:

BRUCE LEHMAN

*Attesting Officer*    *Commissioner of Patents and Trademarks*